(12) United States Patent
Holtsclaw et al.

(10) Patent No.: US 9,422,420 B2
(45) Date of Patent: Aug. 23, 2016

(54) LOW-TEMPERATURE BREAKER FOR WELL FLUID VISCOSIFIED WITH A POLYACRYLAMIDE

(71) Applicant: HALLIBURTON ENERGY SERVICES, INC., Houston, TX (US)

(72) Inventors: Jeremy Holtsclaw, Kingwood, TX (US); Dipti Singh, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 460 days.

(21) Appl. No.: 13/757,464

(22) Filed: Feb. 1, 2013

(65) Prior Publication Data

US 2014/0221256 A1  Aug. 7, 2014

(51) Int. Cl.
  C09K 8/86 (2006.01)
  C08L 5/00 (2006.01)
  C09K 8/035 (2006.01)
  C08L 33/14 (2006.01)

(52) U.S. Cl.
  CPC ............... C08L 5/00 (2013.01); C08L 33/14 (2013.01); C09K 8/035 (2013.01); C09K 8/86 (2013.01)

(58) Field of Classification Search
  None
  See application file for complete search history.

(56) References Cited

U.S. PATENT DOCUMENTS

| | | | |
|---|---|---|---|
| 2,820,777 A * | 1/1958 | Tzeng et al. | 526/75 |
| 3,442,803 A * | 5/1969 | Hoover et al. | 507/225 |
| 3,779,914 A * | 12/1973 | Nimerick | 507/211 |
| 3,818,991 A * | 6/1974 | Nimerick | 166/283 |
| 4,460,751 A | 7/1984 | Hanlon et al. | |
| 4,579,670 A | 4/1986 | Payne | |
| 4,683,954 A | 8/1987 | Dill | |
| 4,797,216 A | 1/1989 | Hodge | |
| 5,080,171 A | 1/1992 | Wolf et al. | |
| 5,256,331 A | 10/1993 | Heitner | |
| 5,384,372 A | 1/1995 | Lattime | |
| 5,393,439 A | 2/1995 | Laramay et al. | |
| 6,784,141 B1 | 8/2004 | King et al. | |
| 7,004,254 B1 | 2/2006 | Chatterji et al. | |
| 7,232,793 B1 | 6/2007 | King et al. | |
| 7,268,100 B2 | 9/2007 | Gatlin et al. | |
| 7,271,134 B2 | 9/2007 | King et al. | |
| 7,547,665 B2 | 6/2009 | Welton | |
| 7,621,335 B2 | 11/2009 | Valeriano et al. | |
| 7,947,627 B2 | 5/2011 | Hoefer | |
| 2006/0042663 A1 | 3/2006 | Fulmer et al. | |
| 2009/0082228 A1 | 3/2009 | Parris et al. | |

(Continued)

FOREIGN PATENT DOCUMENTS

EP  0514649 B1  10/2000
WO  2014120381 A1  8/2014

OTHER PUBLICATIONS

"Oxygen Scavengers" Guardian CSC, 6 pages.
(Continued)

*Primary Examiner* — John J Figueroa
(74) *Attorney, Agent, or Firm* — Craig W. Roddy; Baker Botts L.L.P.

(57) ABSTRACT

A method for treating a zone of a well with a viscosified fluid is provided, wherein the fluid is adapted to break in the well. The method includes the steps of: (A) introducing a well fluid into the zone of the well, wherein the well fluid includes: (i) a water phase; (ii) a water-soluble polymer in the water-phase; and (iii) a source of a hydroxylamine or salt thereof; and (B) allowing the viscosity of the well fluid to break in the zone.

21 Claims, 5 Drawing Sheets

(56) References Cited

U.S. PATENT DOCUMENTS

2009/0318313 A1 12/2009 Ali et al.
2012/0285685 A1 11/2012 Gupta

OTHER PUBLICATIONS

Darren McDuff, Shalawn Jackson, Chris Shuchart, Dieter Postl, "Understanding Wormholes in Carbonates: Unprecedented Experimental Scale and 3D Visualization," SPE 129329, 2010 Technology Today Series, 4 pages.
Ernesto Barragan, Fabrizio Serrnao, Marco Cayo, Cristian Ramirez, Carlos Martinez, "Clean Up Acid System for Gravel-Pack Completions Without Increasing Water Production," SPE 123869, 2009 SPE Annual Technical Conference and Exhibition, New Orleans, Louisiana, USA, Oct. 4-7, 2009, 9 pages.
Gerald Glasbergin, Nitika Kalia, Malcolm Talbot, "The Optimum Injection Rate for Wormhole Propagation: Myth or Reality?," SPE 121464, 2009 SPE European Formation Damage Conference, Scheveningen, The Netherlands, May 27-29, 2009, 16 pages.
Nitika Kalia, Gerald Glasbergen, "Wormhole Formation in Carbonates under Varying Temperature Conditions," SPE 121803, 2009 SPE European Formation Damage Conference, Scheveningen, The Netherlands, May 27-29, 2009, 19 pages.
Jose A. Mora, Feliz Kondo, Sandra Gonzalez Pinto, "The Challenge of Producing and Stimulating a Deep Sandstone;Carbonate Reservoir With Combined Organic and Inorganic Formation Damage" SPE 121008, 2009 SPE Western Regional, San Jose, California, USA, Mar. 24-26, 2009, 19 pages.
R. Gdanski, "Recent Advances in Carbonate Stimulation" IPTC 10693, International Petroleum Technology Coference, Doha, Qatar, Nov. 21-23, 2005, 8 pages.
Jay P Deville, Jay Turner, "A New Oxygen Scavenger Suitable for High-Temperature Applications," AADE-11-NTCE-22, 2011 AADE National Technical Conference and Exhibition, Houston, Texas,Apr. 12-14, 2011, 8 pages.
"Product Safety Assessment N-Isopropylhydroxylamine" Dow Chemical Company, Nov. 17, 2008, 5 pages.
D.F. Bowman, J.L. Brokenshire, T. Gillan, K.U. Ingold, "Kinetic Application of Electron Paramagnetic Resonance Spectroscopy. II Self-Reactions of N-Alkyl Nitroxides and N-Phenyl Nitroxide" Journal of the American Chemical Society 93:24, Dec. 1, 1971; pp. 6551-6555.
D.F. Bowman, T. Gillan, K.U. Ingold, "Kinetic Application of Electron Paramagnetic Resonance Spectroscopy. III Self-Reactions of Dialkyl Nitroxide Radicals," Journal of the American Chemical Society 93:24, Dec. 1, 1971; pp. 6555-6561.
Ishii et al., "A Novel Catalysis of N-Hydroxyphthalimide in the Oxidation of Organic Substrates by Molecular Oxygen" Journal of Organic Chemistry, vol. 60, No. 13, 1995; pp. 3934-3935.
M.H. Davey, V.Y. Lee, R.D Miller, T.J. Marks, "Synthesis of Aryl Nitroso Derivatives by tert-Butyl Hypochlorite Oxidation in Homogeneous Media. Intermediates for the Preparation of High-Hyperpolarizability Chromophone Skeletons," Journal of Organic Chemistry, vol. 64, No. 13, 1999; pp. 4976-4979.
Riccardo Amorati, Marco Lucarini, Veronica Mugnaini, Gian Franco Pedulli, "Hydroxylamines as Oxidation Catalysts: Thermochemical and Kinetic Studies," Journal of Organic Chemistry, vol. 68, No. 5, 2003; pp. 1747-1754.
Wang et al., "Thermal Decomposition Pathways of Hydroxylamine: Theoretical Investigation on the Initial Steps," Journal of Physical Chemistry A, vol. 114, No. 34, 2010; pp. 9262-9269.
Matthew M. Zhao, Jing Li, Eiichi Mano, Zhinguo J. Song, David M. Tschaen, "Oxidation of Primary Alcohols to Carboxylic Acids with Sodium Chlorite Catalyzed by Tempo and Bleach: 4-Methoxyphenylacetic Acid," Organic Syntheses, vol. 81, 2005; pp. 195-203.
International Search Report dated Apr. 22, 2014 for Application No. PCT/US14/10007.
Office Action issued in related Canadian patent application No. 2,897,076, mailed Sep. 17, 2015.
International Preliminary Report on Patentability issued in related PCT Application No. PCT/US2014/010007, mailed on Aug. 13, 2015 (14 pages).

* cited by examiner

LOW-TEMPERATURE BREAKER FOR WELL FLUID VISCOSIFIED WITH A POLYACRYLAMIDE

CROSS-REFERENCE TO RELATED APPLICATIONS

Not applicable.

TECHNICAL FIELD

The inventions are in the field of producing crude oil or natural gas from subterranean formations. More specifically, the inventions generally relate to the breaking the viscosity of well fluids containing polymeric materials, especially a polyacrylamide at low temperatures of less than 93° C. (200° F.). Such fluids and polymeric materials and can be used in various applications in a well, such as hydraulic fracturing, acidizing, and conformance control.

BACKGROUND

Well Servicing and Well Fluids

To produce oil or gas from a reservoir, a well is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Common Well Treatments and Well fluids

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well.

Well services can include various types of treatments that are commonly performed in a wellbore or subterranean formation. For example, stimulation is a type of treatment performed to enhance or restore the productivity of oil or gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in treatment zones having poor natural permeability. Matrix treatments are often applied in treatment zones having good natural permeability to counteract damage in the near-wellbore area.

Other types of completion or intervention treatments can include, for example, gravel packing, consolidation, acidizing, and controlling excessive water production. Still other types of completion or intervention treatments include, but are not limited to, damage removal, formation isolation, wellbore cleanout, scale removal, and scale control.

Hydraulic Fracturing

Hydraulic fracturing is a common stimulation treatment. The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

Polymers for Increasing Viscosity of Well Fluid

A well fluid can be adapted to be a carrier fluid for particulates.

For example, a proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

Increasing the viscosity of a well fluid can help prevent a particulate having a different specific gravity than a surrounding phase of the fluid from quickly separating out of the fluid.

A viscosity-increasing agent can be used to increase the ability of a fluid to suspend and carry a particulate material in a well fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Well fluids used in high volumes, such as fracturing fluids, are usually water-based. Efficient and inexpensive viscosity-increasing agents for water include certain classes of water-soluble polymers.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

Synthetic polymers and copolymers can be used. Examples of such synthetic polymers include, but are not limited to, polyacrylate, polymethacrylate, polyacrylamide, polyvinyl alcohol, and polyvinylpyrrolidone. Commonly used synthetic polymer acid-viscosity-increasing agents are polymers or copolymers consisting of various ratios of acrylic, acrylamide, acrylamidomethylpropane sulfonic acid, quaternized dimethylaminoethylacrylate, quaternized dimethylaminoethylmethacrylate, and combinations thereof.

Crosslinking of Polymer to Increase Viscosity

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, a polymer may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 mPa·s (20 cP) to about 50 mPa·s (50 cP). When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Crosslinking agents typically comprise at least one metal ion that is capable of crosslinking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Crosslinking agents can include a crosslinking agent composition that may produce delayed crosslinking of an aqueous solution of a crosslinkable organic polymer, as described in U.S. Pat. No. 4,797,216, the entire disclosure of which is incorporated herein by reference. Crosslinking agents can include a crosslinking agent composition that may include a zirconium compound having a valence of +4, an alpha-hydroxy acid, and an amine compound as described in U.S. Pat. No. 4,460,751, the entire disclosure of which is incorporated herein by reference.

Sometimes, however, crosslinking is undesirable, as it may cause the polymeric material to be more difficult to break and it may leave an undesirable residue in the formation.

Other Uses of Polymers in Well Fluids, for Example, as Friction Reducer

There are other uses for a polymers in a well fluid. For example, a polymer may be used as a friction reducer.

During the drilling, completion, or stimulation of subterranean wells, well fluids are often pumped through tubular structures (e.g., pipes, coiled tubing, etc.). A considerable amount of energy may be lost due to turbulence in the well fluid. Because of these energy losses, additional horsepower may be necessary to achieve the desired treatment. To reduce these energy losses, certain polymers (referred to herein as "friction-reducing polymers") have been included in these well fluids.

Suitable friction reducing polymers should reduce energy losses due to turbulence within the well fluid. Those of ordinary skill in the art will appreciate that the friction reducing polymer(s) included in the well fluid should have a molecular weight sufficient to provide a desired level of friction reduction. In general, polymers having higher molecular weights may be needed to provide a desirable level of friction reduction.

A wide variety of friction reducing polymers are available. In certain embodiments, the friction-reducing polymer may be a synthetic polymer. Additionally, for example, the friction-reducing polymer may be an anionic polymer or a cationic polymer.

By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, quaternized aminoalkyl acrylate, such as a copolymer of acrylamide and dimethylaminoethyl acrylate quaternized with benzyl chloride, and mixtures thereof.

Examples of suitable friction reducing polymers are described in: U.S. Pat. No. 6,784,141 issued Aug. 31, 2004 having for named inventors Karen L. King, David E. Mcmechan, and Jiten Chatterji entitled "Methods, Aqueous Well Treating Fluids and Friction Reducers Therefor"; U.S. Pat. No. 7,004,254 issued on Feb. 28, 2006 having for named inventors Jiten Chatterji, Karen L. King, and David E. McMechan entitled "Subterranean Treatment Fluids, Friction Reducing Copolymers, and Associated Methods"; U.S. Pat. No. 7,232,793 issued Jun. 19, 2007 having for named inventors Karen L. King, David E. McMechan; and Jiten Chatterji entitled "Water-Based Polymers for Use as Friction Reducers in Aqueous Treatment Fluids"; U.S. Pat. No. 7,271,134 issued Sep. 18, 2007 having for named inventors Karen L. King, David E. McMechan; and Jiten Chatterji entitled "Water-Based Polymers for Use as Friction Reducers in Aqueous Treatment Fluids"; each of which is incorporated herein by reference in the entirety.

One example of a suitable anionic friction-reducing polymer is a polymer including at least acrylamide and acrylic acid monomeric units. The acrylamide and acrylic acid may be present in the polymer in any suitable concentration. An example of a suitable anionic friction reducing polymer may include at least acrylamide monomer in an amount in the range of from about 5% to about 95% and acrylic acid monomer in an amount in the range of from about 5% to about 95%. Another example of a suitable anionic friction-reducing polymer may include acrylamide in an amount in the range of from about 60% to about 90% by weight and acrylic acid in an amount in the range of from about 10% to about 40% by weight. Another example of a suitable anionic friction-reducing polymer may include acrylamide in an amount in the range of from about 80% to about 90% by weight and acrylic acid in an amount in the range of from about 10% to about 20% by weight. Yet another example of a suitable anionic friction-reducing polymer may include acrylamide in an amount of about 85% by weight and acrylic acid in an amount of about 15% by weight. As previously mentioned, one or more additional monomers may be included in the anionic friction reducing polymer including acrylamide and acrylic acid monomeric units. By way of example, the additional monomer(s) may be present in the anionic friction-reducing polymer in an amount up to about 20% by weight of the polymer.

Suitable friction-reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the well fluid. As used herein, the term "polymer" is intended to refer to the acid form of the friction-reducing polymer as well as its various salts.

Slick-Water Fracturing of Shale Formations

An example of a well treatment that may utilize a friction-reducing polymer is commonly referred to as "high-rate water fracturing" or "slick-water fracturing," which is commonly used for fracturing of ultra-low permeable formations such as shale formations.

Ultra-low permeable formations tend to have a naturally occurring network of multiple interconnected micro-sized fractures. The fracture complexity is sometimes referred to in the art as a fracture network. Ultra-low permeable formations can be fractured to create or increase such multiple interconnected micro-sized fractures. This approach can be used to help produce gas from such an ultra-low permeable formation. According to current technology, a shale formation suitable for economic recovery as a gas reservoir is characterized by having a hydrocarbon content greater than 2% by volume gas filled porosity.

Ultra-low permeable formations are usually fractured with water-based fluids having little viscosity and that are used to suspend relatively low concentrations of proppant. The size of the proppant is sized to be appropriate for the fracture complexity of such a formation, which is much smaller than used for fracturing higher permeability formations such as sandstone or even tight gas reservoirs. The overall purpose is to increase or enhance the fracture complexity of such a formation to allow the gas to be produced. Although the fractures of the fracture network are very small compared to fractures formed in higher permeability formations, they should still be propped open.

Stimulated rock volume is a term used in the art regarding the fracturing of shale or other ultra-low permeability reservoirs. "Ultra-low permeability shale reservoirs require a large fracture network to maximize well performance. Microseismic fracture mapping has shown that large fracture networks can be generated in many shale reservoirs. In conventional reservoirs and tight gas sands, single-plane fracture half-length and conductivity are the key drivers for stimulation performance. In shale reservoirs, where complex network structures in multiple planes are created, the concept of a single fracture half-length and conductivity are insufficient to describe stimulation performance. This is the reason for the concept of using stimulated reservoir volume as a correlation parameter for well performance. The size of the created fracture network can be approximated as the 3-D volume (Stimulated Reservoir Volume or SRV) of the microseismic event cloud." M. J. Mayerhofer, E. P. Lolon, N. R. Warpinski, C. L. Cipolla, and D. Walser, Pinnacle Technologies, and C. M. Rightmire, Forrest A. Garb and Associates; Society of Petroleum Engineers, "SPE Shale Gas Production Conference, 16-18 Nov. 2008, Fort Worth, Tex., USA," "What is Stimulated Rock Volume?" SPE 119890.

The fracturing fluids for use in fracturing ultra-low permeability formations are water-based. One of the reasons for this is the large volumes required, and water is relatively low cost compared to oil-based fluids. Other reasons can include concern for damaging the reservoir and environmental concerns.

Preferably, a friction-reducing polymer can be included in a well fluid in an amount equal to or less than 0.2% by weight of the water present in the well fluid. Preferably, any friction-reducing polymers are included in a concentration sufficient to reduce friction but at a lower concentration than would develop the characteristic of a gel. By way of example, the well fluid including the friction-reducing polymer would not exhibit an apparent yield point. While the addition of a friction-reducing polymer may minimally increase the viscosity of the well fluids, the polymers are not included in the well fluids in an amount sufficient to substantially increase the viscosity. For example, if proppant is included in the wells fluid, velocity rather than fluid viscosity generally may be relied on for proppant transport. In some embodiments, the friction-reducing polymer can be present in an amount in the range of from about 0.01% to about 0.15% by weight of the well fluid. In some embodiments, the friction-reducing polymer can be present in an amount in the range of from about 0.025% to about 0.1% by weight of the well fluid.

Generally, the treatment fluids in slick-water fracturing not relying on viscosity for proppant transport. Where particulates (e.g., proppant, etc.) are included in the fracturing fluids, the fluids rely on at least velocity to transport the particulates to the desired location in the formation. Preferably, a friction-reducing polymer is used in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids for conventional formations. In some slick-water fracturing embodiments, the treatment fluids may have a viscosity up to about 10 mPa·s (10 cP). In some embodiments, the treatment fluids may have a viscosity in the range of from about 0.7 mPa·s (0.7 cP) to about 10 mPa·s (10 cP).

Sand Control and Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range. For various purposes, the gravel particulates also may be coated with certain types of materials, including resins, tackifying agents, and the like. For example, a tackifying agent can help with fines and resins can help to enhance conductivity (e.g., fluid flow) through the gravel pack.

In one common type of gravel packing, a mechanical screen is placed in the wellbore and the surrounding annulus is packed with a particulate of a larger specific size designed to prevent the passage of formation sand or other fines. It is also common, for example, to gravel pack after a fracturing procedure, and such a combined procedure is sometimes referred to as a "frac-packing."

Like with placing a proppant in a subterranean formation during hydraulic fracturing, in gravel packing a viscosified fluid can be used to help transport and place the gravel in the well.

Fluid-Loss Control

Fluid loss refers to the undesirable leakage of a fluid phase of any type of well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filtercake. Depending on the nature of a fluid phase and the filtercake, such a filtercake may help block the further loss of a fluid phase (referred to as a filtrate) into the subterranean formation. A fluid-loss control material is specifically designed to lower the volume of a filtrate that passes through a filter medium. Accordingly, a fluid-loss control material is sometimes referred to as a filtration control agent.

Fluid-loss control materials are sometimes used in drilling fluids or in treatments that have been developed to control fluid loss. A fluid-loss control pill is a treatment fluid that is designed or used to provide some degree of fluid-loss control. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Fluid-loss control pills typically include an aqueous continuous phase and a high concentration of a viscosifying agent (usually crosslinked), and sometimes, bridging particles, such as graded sand, graded salt particulate, or sized calcium carbonate particulate.

Crosslinked gels can also be used for fluid-loss control. Crosslinking the gelling agent polymer helps create a gel structure that can suspend solids as well as provide fluid-loss control. Further, crosslinked fluid-loss control pills have demonstrated that they require relatively limited invasion of the formation face to be fully effective. To crosslink the viscosifying polymers, a suitable crosslinking agent that includes polyvalent metal ions is used. Boron, aluminum, titanium, and zirconium are common examples.

Acidizing

The purpose of acidizing in a well is to dissolve acid-soluble materials. For example, this can help remove residual fluid material or filtercake damage or to increase the permeability of a treatment zone. Conventionally, a treatment fluid including an aqueous acid solution is introduced into a subterranean formation to dissolve the acid-soluble materials. In this way, fluids can more easily flow from the formation into the well. In addition, an acid treatment can facilitate the flow of injected treatment fluids from the well into the formation. This procedure enhances production by increasing the effective well radius.

In acid fracturing, an acidizing fluid is pumped into a formation at a sufficient pressure to cause fracturing of the formation and to create differential (non-uniform) etching leading to higher fracture conductivity. Depending on the formation mineralogy, the acidizing fluid can etch the fracture faces, whereby flow channels are formed when the fractures close. The acidizing fluid can also enlarge the pore spaces in the fracture faces and in the formation.

In matrix acidizing, an acidizing fluid is injected from the well into the formation at a rate and pressure below the pressure sufficient to create a fracture in the formation.

Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, and the references contained therein.

The use of the term "acidizing" herein refers to both matrix and fracturing types of acidizing treatments, and more specifically, refers to the general process of introducing an acid down hole to perform a desired function, e.g., to acidize a portion of a subterranean formation or any damage contained therein.

Conventional acidizing fluids can include one or more of a variety of acids, such as hydrochloric acid, acetic acid, formic acid, hydrofluoric acid, or any combination of such acids. In addition, many fluids used in the oil and gas industry include a water source that may incidentally contain certain amounts of acid, which may cause the fluid to be at least slightly acidic.

When an acidic fluid is used to stimulate a substantially acid-soluble formation below the fracturing pressure, the treatment is called matrix acidizing. Studies have shown that the dissolution pattern created by the flowing acid occurs by one of three mechanisms (a) compact dissolution, in which most of the acid is spent near the wellbore rock face; (b) wormholing, in which the dissolution advances more rapidly at the tips of a small number of wormholes than at the wellbore walls; and (c) uniform dissolution, in which many pores are enlarged. Compact dissolution occurs when acid spends on the face of the formation. In this case, the live acid penetration is commonly limited to within a few centimeters of the wellbore. Uniform dissolution occurs when the acid reacts under the laws of fluid flow through porous media. In this case, the live acid penetration will be, at most, equal to the volumetric penetration of the injected acid. (Uniform dissolution is also the preferred primary mechanism of conductive channel etching of the fracture faces in acid fracturing, as discussed above.) The objectives of the matrix acidizing process are met most efficiently when near wellbore permeability is enhanced to the greatest depth with the smallest volume of acid. This occurs in regime (b) above, when a wormholing pattern develops.

However, just as wormholing prevents the growth of large fractures, wormholing prevents the uniform treatment of long zones of a formation along a wellbore. Once wormholes have formed, at or near a point in the soluble formation where the acid first contacts the formation, subsequently-injected acid will tend to extend the existing wormholes rather than create new wormholes further along the formation. Temporary blockage of the first wormholes is needed so that new wormholes can be formed and the entire section of the formation treated. This is called "diversion," as the treatment diverts later-injected acid away from the pathway followed by earlier-injected acid. In this case, the blockage must be temporary because all the wormholes are desired to serve as production pathways.

Increasing the viscosity or gelling of a fluid can help divert the treatment fluid from higher permeability to lower permeability portions of a zone. This can be useful for leak-off control in acid fracturing or matrix diversion in matrix acidizing.

Similar fluids and methods can be used for "leak-off control" in fracturing and for "diversion" in matrix acidizing. Such a method or acidic fluid may be termed a "leak-off control acid system" or a "self-diverting acid system" depending upon its use and purpose.

There are certain polymeric viscosity-increasing agents that develop viscosity after the acid starts to spent and the pH increases. This results in better diversion that can be considered as another advantage of the fluid. The acid diversion is very important in acid stimulation treatment to enhance oil production by creating better wormholes. It also increases the depth of penetration of acid into the reservoir.

Damage to Permeability

In well treatments using viscous well fluids, the material for increasing the viscosity of the fluid can damage the permeability of the proppant pack or the matrix of the subterranean formation. For example, a well fluid can include a polymeric material that is deposited in the fracture or within the matrix. By way of another example, the fluid may include surfactants that leave unbroken micelles in the fracture or change the wettability of the formation in the region of the fracture.

The term "damage" as used herein regarding a formation refers to undesirable deposits in a subterranean formation that may reduce its permeability. Scale, skin, gel residue, and hydrates are contemplated by this term. Also contemplated by this term are geological deposits, such as, but not limited to, carbonates located on the pore throats of a sandstone formation.

After application of a filtercake, it may be desirable to restore permeability into the formation. If the formation permeability of the desired producing zone is not restored, production levels from the formation can be significantly lower. Any filtercake or any solid or polymer filtration into the matrix of the zone resulting from a fluid-loss control treatment must be removed to restore the formation's permeability, preferably to at least its original level. This is often referred to as clean up.

Breaker for Viscosity of Fluid or Filtercake

After a well fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified well fluid is referred to as "breaking" the fluid. Chemicals used to reduce the viscosity of well fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. This process can occur independently of any crosslinking bonds existing between polymer chains.

In the case of a crosslinked viscosity-increasing agent, for example, one way to diminish the viscosity is by breaking the crosslinks.

Thus, removal of the well fluid is facilitated by using one or more breakers to reduce fluid viscosity.

Unfortunately, another complicating factor exists. Because of the large size of the polymer, a filtration process can occur upon the face of a formation or fracture in conventional formation. A filtercake of the polymer can be formed while the aqueous fluid, KCl, and breakers pass into the matrix of the formation. Careful examination of this filtercake, which may be formed from crosslinked or uncrosslinked guar or other polymer, reveals a semi-elastic, rubberlike membrane. Once the polymer concentrates, it is difficult to solubilize the polymer. For example, a non-filtercake fluid consists of approximately 99.5 percent water and 0.5 percent polymer. Accordingly, for example, when the fracture closes in a fracturing treatment, the permeability of the proppant bed or the formation face may be severely damaged by the polymer filtercake. Viscosified gravel pack fluids need breakers, too. A filtercake deposited for fluid-loss control may also need a breaker to help remove the filtercake.

Breakers must be selected to meet the needs of each situation. First, it is important to understand the general performance criteria of breakers. In reducing the viscosity of the well fluid to a near water-thin state, the breaker must maintain a critical balance. Premature reduction of viscosity during the pumping of a well fluid can jeopardize the treatment. Inadequate reduction of fluid viscosity after pumping can also reduce production if the required conductivity is not obtained.

A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature. A typical gravel pack break criteria is a minimum 4-hour break time.

Chemical breakers used to reduce viscosity of a well fluid viscosified with a viscosity-increasing agent or to help remove a filtercake formed with such a viscosity-increasing agent are generally grouped into three classes: oxidizers, enzymes, and acids.

For a polymeric viscosity-increasing agent, the breakers operate by cleaving the backbone of polymer by hydrolysis of acetyl group, cleavage of glycosidic bonds, oxidative/reductive cleavage, free radical breakage, or a combination of these processes.

Oxidizing Breakers

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation-reduction chemical reactions occur as the polymer chain is broken.

Different oxidizers are selected based on their performance at different temperature and pH ranges. Consideration is also given to the rate of oxidation at a particular temperature and pH range. For example, the rate at which a persulfate molecule breaks into two radicals is temperature dependent. Below 120° F. (49° C.) this process occurs very slowly, and the reaction can be catalyzed to obtain acceptable break rates. A variety of catalysts, including various organic amines, can be used for persulfate breakers. The optimum pH for persulfate oxidation is around 10 at low temperature (less than 150° F. or 66° C.). Above approximately 200° F. (93° C.), persulfate decomposes very quickly and breaks the polymer very quickly (i.e., with little delay in the break). Therefore, persulfate is generally not recommended as a breaker above about 200° F. Similarly chlorites are used for high temperature breakage in the range of about 150° F. to about 350° F. with optimum pH range of 6 to 12. Some breakers can also be activated by catalysts such as cobalt acetate, EDTA, NTA, etc. to function at different temperature ranges. Hypochlorites are generally used for low temperature breakage of natural polymers.

Enzymatic Breakers

Enzymes are also used to break the natural polymers in oil field applications. They are generally used at low temperature 25° C. (77° F.) to 70° C. (158° F.) as at higher temperature they denature and become ineffective. At very low temperatures, enzymes are not as effective as the rate of breakage of polymer is very slow and they are generally not recommended. Different types of enzymes are used to break different types of bond in the polysaccharides. Some enzymes break only α-glycosidic linkage and some break β-glycosidic linkage in polysaccharides. Some enzymes break polymers by hydrolysis and some by oxidative pathways. Generally, Hemicellulase is used to break guar polymers and Xanthanase is used to break Xanthan polymers. A specific enzyme is needed to break a specific polymer/polysaccharide. Enzymes are referred to as Nature's catalysts because most biological processes involve an enzyme.

Acid Breakers

Acids also provide a break via hydrolysis. Acids, however, pose various difficulties for practical applications. Acids are not used as a polysaccharide polymer breaker very often because of cost, poor break rate control, chemical compatibility difficulties, and corrosion of metal goods in a well.

Breaking of Polyacrylamides More Difficult

Fluids viscosified with a polyacrylamide, whether used as a viscosity-increasing agent, as a crosslinker, or both, can be more difficult to break in a controlled manner than fluids viscosified with a single-chain polysaccharide such as a guar. This is especially the case at lower temperatures of less than 93° C. (200° F.).

SUMMARY OF THE INVENTION

A method for treating a zone of a well with a viscosified fluid is provided, wherein the fluid is adapted to break in the well. The method includes the steps of: (A) introducing a well fluid into the zone of the well, wherein the well fluid includes: (i) a water phase; (ii) a water-soluble polymer in the water-phase; and (iii) a source of a hydroxylamine or salt thereof; and (B) allowing the viscosity of the well fluid to break in the zone.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

The accompanying drawing is incorporated into the specification to help illustrate examples according to the presently most-preferred embodiment of the invention.

DETAILED DESCRIPTION OF PRESENTLY PREFERRED EMBODIMENTS AND BEST MODE

Definitions and Usages

General Interpretation

Figure 1:
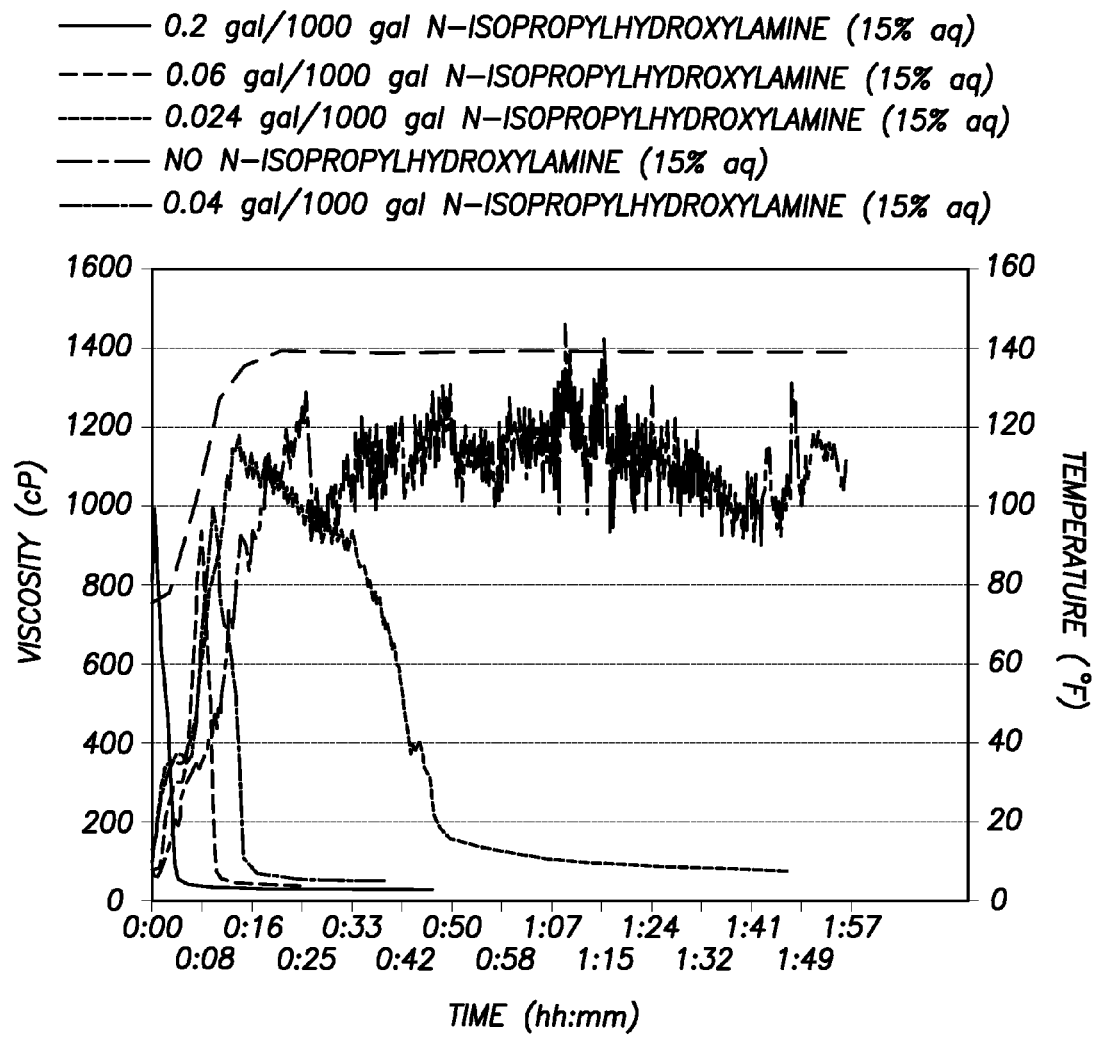
FIG. 1 is a graph showing the degradation of viscosity for an aqueous fluid of 10 lb/1000 gal guar crosslinked with 5 gal/1000 gal derivatized polyacrylamide crosslinker with varying concentrations of N-isopropylhydroxylamine (15% aq.) as heated from room temperature to 60° C. (140° F.).

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location. Tubulars can be of any suitable body material, but in the oilfield they are most commonly of steel.

As used herein, a "well fluid" broadly refers to any fluid adapted to be introduced into a well for any purpose. A well fluid can be, for example, a drilling fluid, a setting composition, a treatment fluid, or a spacer fluid. If a well fluid is to be used in a relatively small volume, for example less than about 200 barrels (about 8,400 US gallons or about 32 m$^3$), it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

As used herein, the word "treatment" refers to any treatment for changing a condition of a portion of a pipeline, a wellbore, or a subterranean formation adjacent a wellbore; however, the word "treatment" does not necessarily imply any particular treatment purpose. A treatment usually involves introducing a well fluid for the treatment, in which case it may be referred to as a treatment fluid, into a well. As used herein, a "treatment fluid" is a well fluid used in a treatment. The word "treatment" in the term "treatment fluid" does not necessarily imply any particular treatment or action by the fluid.

A "portion" of a well or pipeline refers to any downhole portion of the well or any portion of the length of a pipeline.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a well fluid at the time it is introduced, or a well fluid mixed with another other fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the well fluid on the BHST during treatment. The design temperature for a well fluid is sometimes referred to as the bottom hole circulation temperature ("BHCT"). Because well fluids may be considerably cooler than BHST, the difference between the two temperatures can be quite large. Ultimately, if left undisturbed, a subterranean formation will return to the BHST.

Substances, Chemicals, and Derivatives

A substance can be a pure chemical or a mixture of two or more different chemicals.

As used herein, a "polymer" or "polymeric material" includes polymers, copolymers, terpolymers, etc. In addition, the term "copolymer" as used herein is not limited to the combination of polymers having only two monomeric units, but includes any combination of monomeric units, e.g., terpolymers, tetrapolymers, etc.

For example, as used herein, a polyacrylamide includes a polymer, copolymer, terpolymer, etc. of acrylamide.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Physical States and Phases

The common physical states of matter include solid, liquid, and gas.

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

Hydratability or Solubility

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

A substance is considered to be "soluble" in a liquid if at least 1 grams of the substance can be hydrated or dissolved in one liter of the liquid when tested at 77° F. and 1 atmosphere pressure for 2 hours, considered to be "insoluble" if less than 0.1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. The continuous phase of a well fluid is a liquid under Standard Laboratory Conditions. For example, a well fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In the context of a well fluid, oil is understood to refer to an oil liquid, whereas gas is understood to refer to a physical state of a substance, in contrast to a liquid. In this context, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent units.

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

In general, a FANN™ Model 35 viscometer is used for viscosity measurements of less than about 30 cP. In addition, the Model 35 does not have temperature and pressure controls, so it is used for fluids at ambient conditions (that is, Standard Laboratory Conditions). Except to the extent otherwise specified, the apparent viscosity of a fluid having a viscosity of less than about 30 cP (excluding any suspended solid particulate larger than silt) is measured with a FANN™ Model 35 type viscometer with a bob and cup geometry using an R1 rotor, B1 bob, and F1 torsion spring at a shear rate of 511 1/s (300 rpm) and at a temperature of 77° F. (25° C.) and a pressure of 1 atmosphere.

In general, a FANN™ Model 50 viscometer is used for viscosity measurements of greater than about 30 cP. The Model 50 has temperature and pressure controls. Except to the extent otherwise specified, the apparent viscosity of a fluid having a viscosity of greater than about 35 cP (excluding any suspended solid particulate larger than silt) is measured with a FANN™ Model 50 type viscometer with a bob and cup geometry using an R1 rotor, B5 bob, and 420 or 440 spring at a shear rate of 40 sec-1 (47 rpm) and at a temperature of 77° F. (25° C.) and pressure about 500 psi.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

A substance is considered to be a fluid if it has an apparent viscosity less than 5,000 mPa·s (5,000 cP) (independent of any gel characteristic). For reference, the viscosity of pure water is about 1 mPa·s (1 cP).

As used herein, a well fluid is considered to be "viscous" if it has an apparent viscosity of 5 mPa·s (5 cP) or higher. The viscosity of a viscous fluid is considered to break or be broken if the viscosity is greatly reduced, that is, the viscosity is reduced at least 50%.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

As used herein, "% wt/vol" means the mass-volume percentage, sometimes referred to as weight-volume percentage or percent weight per volume and often abbreviated as % m/v or % w/v, which describes the mass of the solute in g per 100 mL of the liquid. Mass-volume percentage is often used for solutions made from a solid solute dissolved in a liquid.

If there is any difference between U.S. or Imperial units, U.S. units are intended.

Unless otherwise specified, mesh sizes are in U.S. Standard Mesh.

The conversion between pound per thousand gallons (pptg or lb/Mgal) and kilogram per cubic meter (kg/m$^3$) is: 1 lb/Mgal=(0.45 kg/lb)×(Mgal/3.8 m$^3$)=0.12 kg/m$^3$.

The conversion between gallons per thousand gallons ("gptg") and % by volume is: 1 gal/Mgal=0.1% by volume.

DESCRIPTION OF THE INVENTION

Controlled degradation and breaking of a fluid viscosified with a polyacrylamide has been a challenge. Most oxidizers either break the viscosity of the fluid too quickly or do not work at all. In addition, the degradation product with many oxidizers has the capability to reheal and return to high viscosity as the temperature drops.

A new chemical method is provided for controllable fluid breaks of polyacrylamide (PAM) polymers. The method has application for a number of PAM applications in a well. These include water fracturing, crosslinked polymeric systems such as those using a derivatized polyacrylamide crosslinker or an AMPS-acrylamide-acrylic acid co-polymer, and acidizing and conformance applications that use such polymers.

According to the invention, N-isopropylhydroxylamine has demonstrated breaker capabilities for polyacrylamides and derivatized polyacrylamides in well fluid applications.

In addition, N-isopropylhydroxylamine is not only an effective breaker for polyacrylamides, but also can be used in effective degradation of a galactomannan such as guar. The use of N-isopropylhydroxylamine as a breaker in other polysaccharide systems should also be applicable.

Other hydroxylamine compounds are also expected to give viscosity reduction control, including but not limited to the group consisting of: N-hydroxysuccinimide, N-tert-butyl hydroxylamine, N,N-dimethylhydroxylamine, N,N-diethylhydroxylamine, N-hydroxyphthalimide, and any combination thereof.

This invention can give a new tool for using PAM polymers for oil and gas application such as hydraulic fracturing, acidizing, conformance control, etc. For example, such hydroxylamine containing molecules can be used as breakers for a derivatized polyacrylamide crosslinker at low temperatures of less than 93° C. (200° F.). One advantage of using hydroxylamines as breakers for PAM polymers is that a controllable fluid breaks is possible at such lower temperatures. The challenges of breaking PAM polymers in aqueous environments at low temperatures are noteworthy. This gives us a tool to break these polymers rapidly in less than 2 hours at temperature less than or equal to 60° C. (140° F.).

Hydroxylamines have been used as free radical scavengers, polymerization inhibitors, and in water treatment applications. Oxygen scavengers are generally used in oilfield applications at higher temperatures (i.e., greater than 149° C. (300° F.)).

Breaker capability of hydroxylamines for polyacrylamide polymers as a viscosity-increasing agent in well fluids has not been explored. In addition, the breaker capability of hydroxylamines for derivatized polyacrylamides as crosslinkers for increasing the viscosity in well fluids has not been explored. Moreover, the breaker capabilities of hydroxylamines has not been explored for applications in a well at lower temperatures of less than 93° C. (200° F.).

According to the invention, a method for treating a zone of a well with a viscosified fluid is provided, wherein the viscosity of the fluid is adapted to break in the well. The method includes the steps of: (A) introducing a well fluid into the zone of the well, wherein the well fluid includes: (i) a water phase; (ii) a water-soluble polymer in the water-phase; and (iii) a source of a hydroxylamine or salt thereof; and (B) allowing the viscosity of the well fluid to break in the zone. Preferably, the well fluid has a viscosity greater than 5 cP.

Well Fluid

In general, a well fluid according to the invention includes: (i) a water phase; (ii) a water-soluble polymer in the water-phase; and (iii) a source of a hydroxylamine or salt thereof; wherein the well fluid has a viscosity greater than 5 mPa·s (5 cP).

Water Phase

The well fluid is preferably a water-based fluid, that is, wherein the continuous aqueous phase of the fluid is greater than 50% by weight water based on the combined weight of water and any other solvents in the phase (that is, excluding the weight of any dissolved solids).

The water preferably is present in the well fluids in an amount at least sufficient to substantially hydrate the viscosity-increasing agent. In some embodiments, the aqueous phase, including the dissolved materials therein, may be present in the well fluids in an amount in the range from about 5% to 100% by volume of the well fluid.

Preferably, the water for use in the well fluid does not contain anything that would adversely interact with the other components used in the well fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the well fluid may comprise a brine. The brine chosen should be compatible with the formation and should have a sufficient density to provide the appropriate degree of well control.

Salts may optionally be included in the well fluids for many purposes. For example, salts may be added to a water source, for example, to provide a brine, and a resulting well fluid, having a desired density. Salts may optionally be included for reasons related to compatibility of the well fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a well fluid.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

In some embodiments, the water phase has a pH less than 7, wherein a basic pH adjuster is not used or desired.

Viscosity-Increasing Agent and Optional Crosslinker

The water-soluble polymer is intended and selected as a viscosity-increasing agent for the fluid.

The water-soluble polymer can comprise a polysaccharide or derivative thereof. In the case of a polysaccharide, the water-soluble polymer preferably is or comprises a galactomannan or derivative thereof.

Preferably, the water-soluble polymer is or comprises a polyacrylamide or derivative thereof.

The viscosity-increasing agent can be provided in any form that is suitable for the particular well fluid or application. For example, the viscosity-increasing agent can be provided as a liquid, gel, suspension, or solid additive that is incorporated into a well fluid.

A viscosity-increasing agent may be present in the well fluids in a concentration in the range of from about 0.01% to about 5% by weight of the continuous phase therein.

The viscosity-increasing agent should be present in a well fluid in a form and in an amount at least sufficient to impart the desired viscosity to a well fluid. For example, the concentration of viscosity-increasing agent used in the well fluids may vary from about 0.25 pounds per 1,000 gallons of well fluid ("lb/Mgal") to about 200 lb/Mgal. In other embodiments, the concentration of viscosity-increasing agent included in the well fluids may vary from about 10 lb/Mgal to about 80 lb/Mgal.

In some embodiments of the invention, the well fluid additionally comprises a crosslinker for the water-soluble polymer. The crosslinker can be or comprise a transition metal. Preferably, the crosslinker comprises a polymeric crosslinker. More preferably, the polymeric crosslinker comprises a polyacrylamide derivative. For example, the polyacrylamide derivative can be or comprise a polyacrylamide having one or more boronic acid functionalities, such as being a copolymer of acrylamide and 3-acrylamido-phenyl boronic acid. According to the method wherein the well fluid includes a crosslinker for the water-soluble polymer, the well fluid does not need to include a transition metal crosslinker.

Where present, the crosslinking agent generally should be included in the fluids in an amount sufficient, among other things, to provide the desired degree of cross linking. In some embodiments, the crosslinking agent may be present in the well fluids in an amount in the range of from about 0.01% to about 5% by weight of the well fluid.

In some applications of the method, the well fluid has a viscosity greater than 50 cP. Preferably, the well fluid has a viscosity of at least 100 cP.

Hydroxylamine as Breaker

Preferably, the hydroxylamine is not in a the form of a coordination complex, but rather is more free to act as a chemical breaker for polyacrylamide. A "coordination complex" (sometimes known as a "metal complex") is an atom or ion (usually metallic) with a surrounding array of bound anions (known as "ligands"), wherein the ligands are often part of a larger molecule known as a "complexing agent"). The metallic ion is usually a transition metal having a valence state of at least two.

The hydroxylamine or salt thereof should be water soluble. Preferably, the hydroxylamine or salt thereof is dissolved in the water phase.

"Salts" of hydroxylamines include, for example, hydrohalides (such as a hydrochloride), hydrogen sulfates, acetates, and carboxylates.

Preferably, the hydroxylamine or salt thereof is an amine substituted hydroxylamine, wherein one or both of the amine hydrogens is substituted, which is known as an N-hydroxylamine. The substitution can be alkyl or aryl. More preferably, the substitution is a short-chain alkyl group or an aryl group having less than 6 carbon atoms. In addition, an N,N substitution can be cyclic, such as of a succinimide or a phthalimide.

Preferably, the hydroxylamine is selected from the group consisting of: N-isopropylhydroxylamine, N-hydroxysuccinimide (also known as 1-Hydroxy-2,5-pyrrolidinedione), N-tert-butyl hydroxylamine, N,N-dimethylhydroxylamine, N,N-diethylhydroxylamine, N-hydroxyphthalimide (also known as 2-Hydroxy-1H-isoindole-1,3(2H)-dione), a salt of any of the foregoing, and any combination thereof. More preferably, the hydroxylamine is or comprises N-isopropylhydroxylamine or salt thereof.

The hydroxylamine is preferably included in a well fluid in a form and concentration at selected to achieve the desired viscosity reduction at a desired time.

The breaker can optionally be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breaker with a material that will degrade when downhole so as to release the breaker when desired. Resins that may be suitable include, but are not limited to, polymeric materials that will degrade under downhole conditions.

Preferably, the hydroxylamine or salt thereof is in a concentration less than 1% by weight of the water. More preferably, the hydroxylamine is in a concentration of less than 0.1% by weight of the water.

Preferably, the well fluid does not include any effective breaker for the water-soluble polymer that is selected from the group consisting of: an oxidizing breaker, an enzymatic breaker, an acid breaker, and any combination thereof.

Controlling Break Time and Design Temperature

Preferably, the method includes the step of controlling the breaking time at the design temperature by adjusting the concentration of the hydroxylamine or salt thereof.

The method has particular application to a zone having a design temperature of less than 93° C. (200° F.), at which temperatures it is has been difficult to control the break time of well fluids including polyacrylamides. The method can be used in a zone having a design temperature of less than 66° C. (150° F.). In addition, the method can be used in a zone having a design temperature of less than 49° C. (130° F.). In all these temperatures, the break time can be controlled to be less than a about 4 hours, depending on the concentration of the polymeric material in the fluid, the concentration of the hydroxylamine or salt thereof, and design temperature in the zone.

As the method is effective for breaking a well fluid viscosified with a polyacrylamide at a low temperature of less than 93° C. (200° F.), the well fluid does not require or does not include any thermal stabilizer.

Particulate in Well Fluid

In certain applications, the well fluid can include a particulate. A particulate, such as proppant or gravel, can be used. Examples include sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate.

In addition, particulate that has been chemically treated or coated may also be used. The term "coated" does not imply any particular degree of coverage of the particulates with the resin or tackifying agent.

Other Well Fluid Additives

In certain embodiments, the well fluids also can optionally comprise other commonly used well fluid additives, such as those selected from the group consisting of: surfactants, bactericides, fluid-loss control additives, stabilizers, chelants, scale inhibitors, corrosion inhibitors, hydrate inhibitors, clay stabilizers, salt substitutes (such as trimethyl ammonium chloride), relative permeability modifiers (such as HPT-1™ commercially available from Halliburton Energy Services, Duncan, Okla.), sulfide scavengers, fibers, nanoparticles, and any combinations thereof.

It should be understood, however, that in many applications the well fluid does not include hydraulic cement and the well fluid is not a hydraulic cement composition.

Well Fluid as Emulsion

In some embodiments, the well fluid can be in the form of an emulsion. For example, it may be desirable to use an emulsion to, inter alia, reduce fluid loss to the subterranean formation, or to provide enhanced particulate suspension. Other benefits and advantages to using emulsions for certain well fluids and methods will be evident to one of ordinary skill in the art.

Foamed Well Fluid

In some embodiments, the well fluid can be foamed (e.g., a liquid that comprises a gas such as nitrogen or carbon dioxide). In certain embodiments, it may desirable that the well fluid is foamed to, inter alia, reduce the amount of well fluid that is required, e.g. in water sensitive subterranean formations, to reduce fluid loss to the subterranean formation, enhance flow back of fluids, or to provide enhanced particulate suspension. In addition, in certain embodiments where the well fluids are used for fluid diversion, it may be desirable that the treatment be foamed.

While various gases can be utilized for foaming the well fluids, nitrogen, carbon dioxide, and mixtures thereof are preferred. In examples of such embodiments, the gas may be present in a well fluid in an amount in the range of from about 5% to about 98% by volume of the well fluid, and more preferably in the range of from about 20% to about 80%. The amount of gas to incorporate into the fluid may be affected by factors including the viscosity of the fluid and wellhead pressures involved in a particular application.

Method of Treating a Well with the Well Fluid

According to another embodiment of the invention, a method of treating a well, is provided, the method including the steps of: forming a well fluid according to the invention; and introducing the well fluid into the well.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In some applications, the step of introducing is at a rate and pressure below the fracture pressure of the treatment zone.

In some applications, the step of introducing comprises introducing under conditions for fracturing a treatment zone. The fluid is introduced into the treatment zone at a rate and pressure that are at least sufficient to fracture the zone.

After the step of introducing a well fluid, the method includes the step of allowing the fluid to break in the well. This preferably occurs with time under the conditions in the zone of the subterranean fluid.

Preferably, design to be broken within about 24 hours, regardless of actual flow back, and preferably within about 2 to about 4 hours. It should be appreciated that the flow back can be any time after the fluid has broken, even weeks later, or longer, as may be convenient for the operator. In an embodiment, the step of flowing back is within about 1 week of the step of introducing. More preferably, the step of flowing back is within about 8 hours of the step of introducing.

Preferably, after any such well treatment, a step of producing hydrocarbon from the subterranean formation is the desirable objective.

Examples

To facilitate a better understanding of the present invention, the following examples of certain aspects of some embodiments are given. In no way should the following examples be read to limit, or define, the entire scope of the invention.

Chemicals & Measuring Equipment

All test fluids were water-based fluids.

N-isopropylhydroxylamine is commercially available from Dow Chemical Company in Illinois, as HYDRO-GUARD™ I-15, a 15% by weight solution of N-isopropylhydroxylamine ("IPHA") in water, which source material is referred to herein as "N-isopropylhydroxylamine (15% aq.)".

The "derivatized polyacrylamide crosslinker" as used in the following examples is about 33% by weight copolymer of acrylamide (99%) and 3-acrylamido-phenyl boronic acid (1%) in an inverse emulsion. Boronic acid functionality grafted on acrylamide can be used for crosslinking of guar. The inverse emulsion breaks upon dilution with water in the test fluids to release the copolymer into the water.

The "AMPS-acrylamide-acrylic acid co-polymer" as used in the following examples was about 50% (w/w) with the balance mostly white mineral oil and surfactants. It was developed for high-temperature stimulation applications.

Isoascorbic acid, sodium salt was added as an iron reducer, reducing ferric iron ($Fe^{+3}$) to ferrous iron ($Fe^{+2}$) and oxygen scavenger in a high-temperature test at 149° C. (300° F.). By reducing ferric iron to ferrous iron and by scavenging oxygen, the precipitation of dissolved iron from solution may be prevented. Ferric iron will be completely precipitated from solution at a pH of 3.5, while ferrous iron will not precipitate from solution until the fluid pH reaches 7.5.

A delayed $Zr^{4+}$ crosslinker used in the following examples was about 5% by Zr ion mass, ligands lactate and triisopropanol amine.

An accelerated $Zr^{4+}$ crosslinker used in the following examples was about 5% by Zr ion mass, ligands acetate or lactate.

The shear rate sweep measurements from 0.1 $s^{-1}$ to 1,000 $s^{-1}$ were performed using a TA Instruments model "ARES™ Model G2" rheometer with a 27 ml din bob and 30 mm cup.

Experimental Results

FIG. 1 shows degradation of viscosity for an aqueous fluid of 10 lb/1000 gal guar crosslinked with 5 gal/1000 gal the derivatized polyacrylamide crosslinker with varying concentrations of N-isopropylhydroxylamine (15% aq.) at 60° C. (140° F.). Increasing the concentration of N-isopropylhydroxylamine results in a shorter time for the decreasing the viscosity of the crosslinked fluid system. Accordingly, the degradation of the fluid viscosity can be controlled by varying the concentration of N-isopropylhydroxylamine. With varying dilution of N-isopropylhydroxylamine desired degradation time can be achieved.

Figure 2:
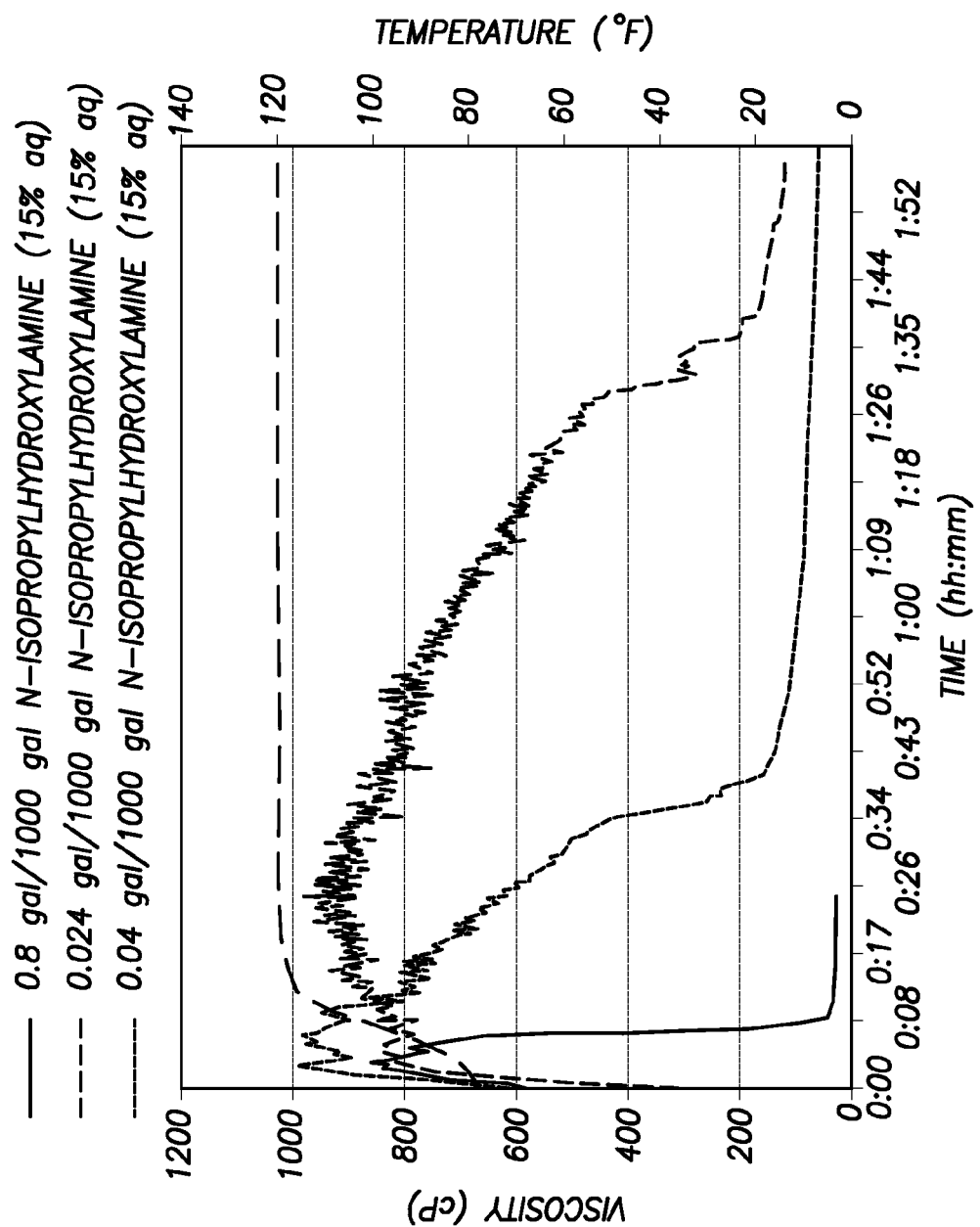
FIG. 2 is a graph showing the degradation of viscosity for an aqueous fluid of 10 lb/1000 gal guar crosslinked with 4 gal/1000 gal derivatized polyacrylamide crosslinker with varying concentration of N-isopropylhydroxylamine (15% aq.) as heated from room temperature to 49° C. (120° F.).

FIG. 2 shows degradation of viscosity for an aqueous fluid of 10 lb/1000 gal guar crosslinked with 4 gal/1000 gal derivatized polyacrylamide crosslinker with varying concentrations of N-isopropylhydroxylamine (15% aq.) at 49° C. (120° F.). This shows that N-isopropylhydroxylamine can be successfully used as breaker even at the lower temperature 49° C. (120° F.). In addition, for this fluid system with a concentration of 0.08 gal/1000 gal N-isopropylhydroxylamine (15% aq.), the viscosity of the fluid does not reheal at 23° C. (73° F.), from which it can be inferred that the N-isopropylhydroxylamine is permanently breaking down the crosslinked polymer network.

Figure 3:
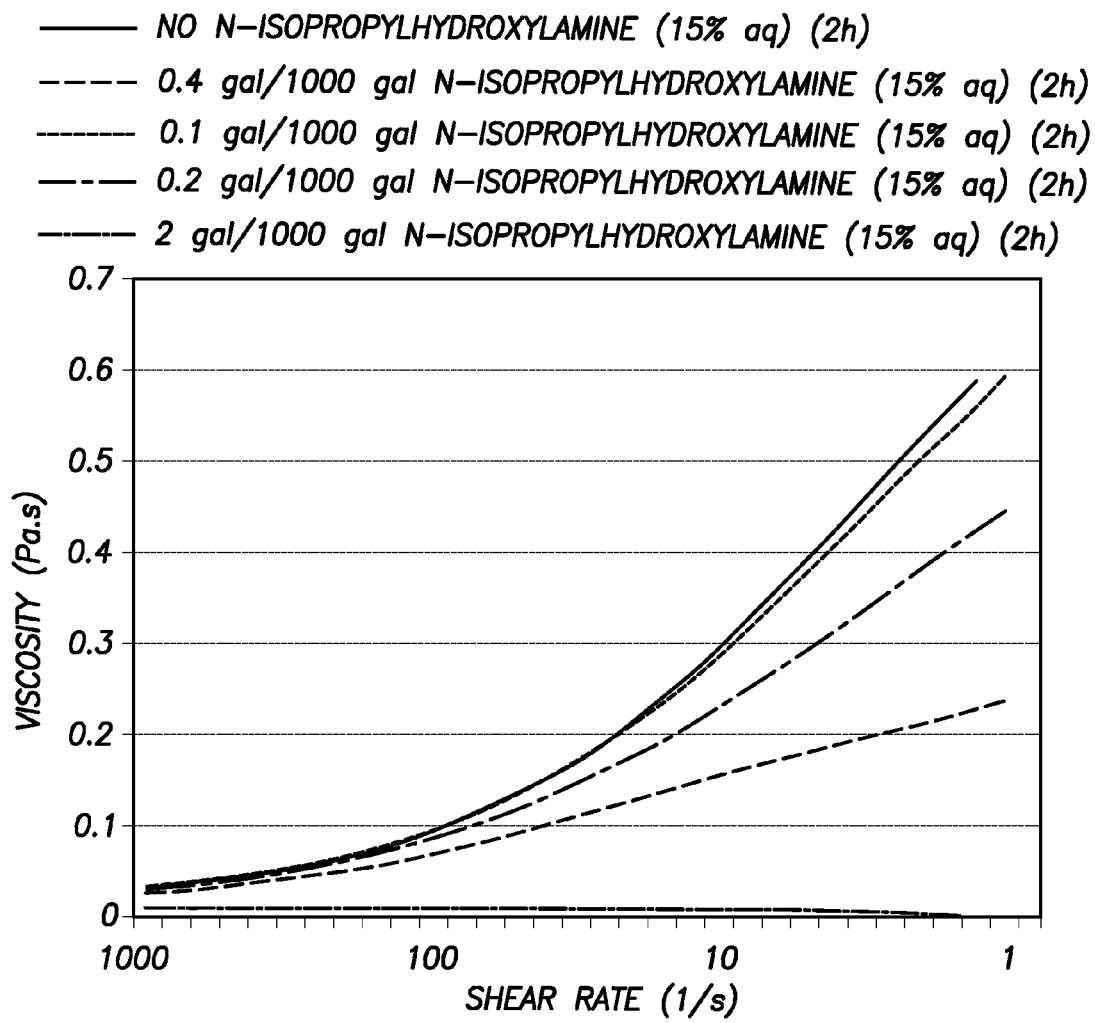
FIG. 3 is a graph showing the viscosity sweep for an aqueous fluid of 50 lb/1000 gal guar crosslinked with 20 gal/1000 gal derivatized polyacrylamide crosslinker with varying concentration of N-isopropylhydroxylamine (15% aq.) after degradation at 60° C. (140° F.) for 2 hours and then cooled to 25° C. (77° F.).

In order to study the significant and permanent reduction in viscosity without rehealing, higher concentrations of the guar and the derivatized polyacrylamide crosslinker were tested. Fluid samples of 50 lb/1000 gal guar crosslinked with 20 gal/1000 gal derivatized polyacrylamide crosslinker with varying concentrations of N-isopropylhydroxylamine (15% aq.) were maintained at 60° C. (140° F.) for 2 hours. After the fluid samples were allowed an additional 2 hours to cool to room temperature (25° C. (77° F.)), a shear rate sweep from 0.1 $s^{-1}$ to 1,000 $s^{-1}$ was performed using an ARES™ G2 controlled strain viscometer. FIG. 3 shows the viscosity sweep for an aqueous fluid of 50 lb/1000 gal guar crosslinked with 20 gal/1000 gal derivatized polyacrylamide crosslinker with varying concentrations of N-isopropylhydroxylamine (15% aq.) after degradation at 60° C. (140° F.) for 2 hours and then cooled to 25° C. (77° F.). The N-isopropylhydroxylamine did not have much effect on the viscosity sweep relative to the control when used in very low concentration (0.1 gal/1000 gal). As the concentration of the N-isopropylhydroxylamine was increased to 0.4 gal/1000 gal, about 0.35 Pa·s (350 cP) decrease in reheal viscosity was observed at the lowest measured shear rate of 1 $s^{-1}$. Increasing the concentration of N-isopropylhydroxylamine (15% aq.) up to 2 gal/1000 gal resulted in the complete degradation of the test fluid with no viscosity rehealing capability.

Figure 4:
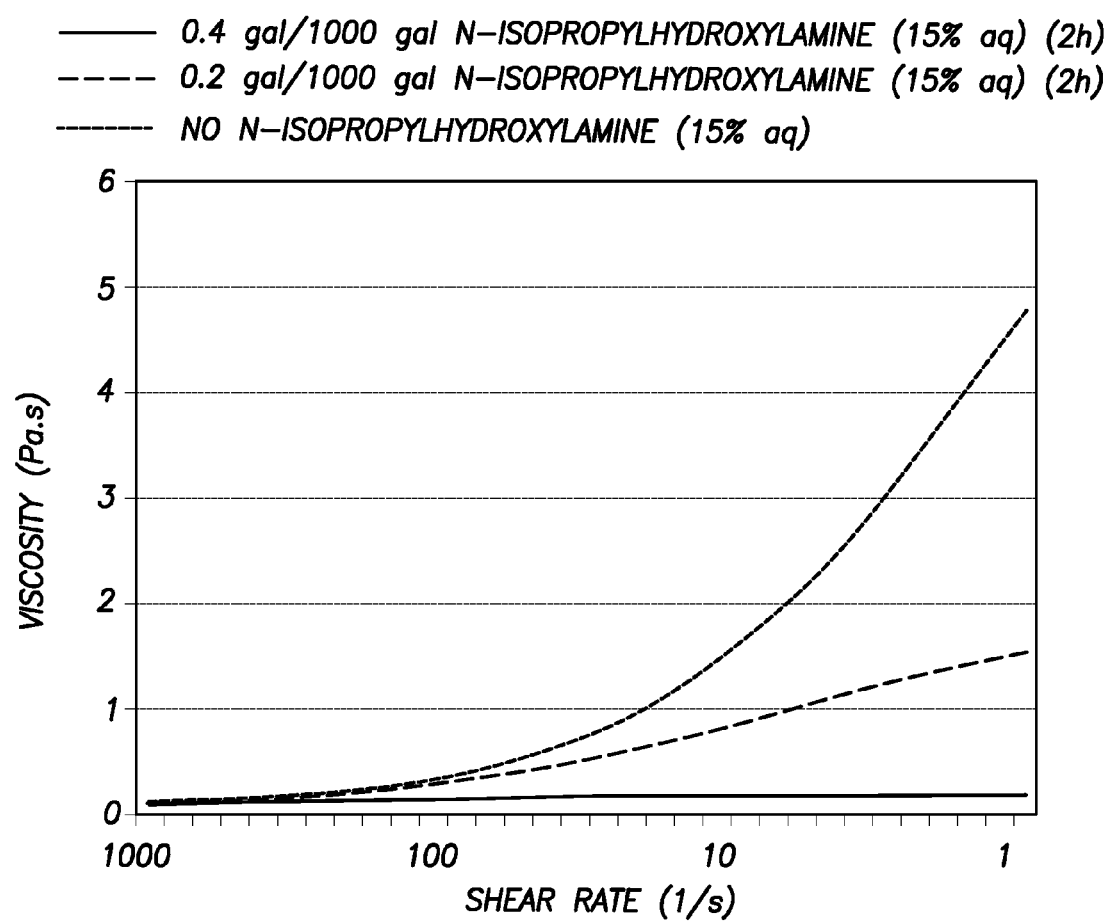
FIG. 4 shows the viscosity sweep for an aqueous fluid of 50 lb/1000 gal guar (without any crosslinker) with varying concentration of N-isopropylhydroxylamine (15% aq.) after degradation at 60° C. (140° F.) for 2 hours and then cooled to 25° C. (77° F.).

FIG. 4 shows the viscosity sweep for an aqueous fluid of 50 lb/1000 gal guar (without any crosslinker) with varying concentrations of N-isopropylhydroxylamine (15% aq.) after degradation at 60° C. (140° F.) for 2 hours and then cooled to 25° C. (77° F.). A significant decrease in viscosity rehealing was observed using a lower concentration of N-isopropylhydroxylamine (15% aq.) (0.2 gal/1000 gal). Using a higher concentration of N-isopropylhydroxylamine (15% aq.) (0.4 gal/1000 gal) degraded 50 lb/1000 gal guar fluid completely in 2 hours with essentially no rehealing. This shows that N-isopropylhydroxylamine is not only an effective breaker for a fluid viscosified with a polyacrylamide, but also can be used in effective degradation of a galactomannan such as guar. The use of N-isopropylhydroxylamine as a breaker in other polysaccharide systems should also be applicable.

Figure 5:
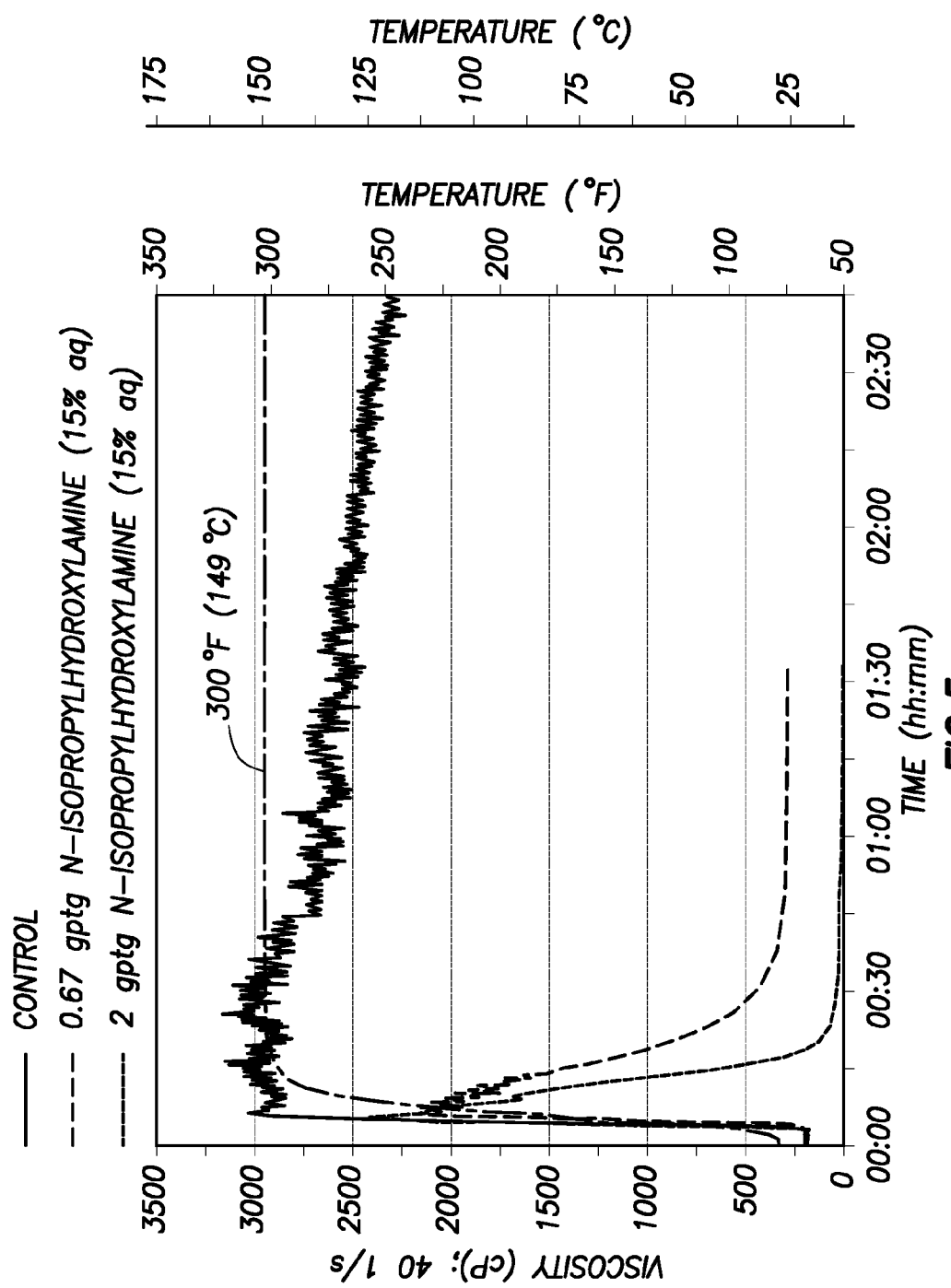
FIG. 5 is a graph showing the degradation of viscosity for an aqueous fluid of 1.25% AMPS-acrylamide-acrylic acid co-polymer crosslinked with 0.5 gal/1000 gal of a $Zr^{4+}$ crosslinker (about 5% by Zr ion mass, ligands lactate and triisopropanol amine) and crosslinked with 2.5 gal/1000 gal of an accelerated $Zr^{4+}$ (about 5% by Zr ion mass, ligands acetate or lactate) with varying concentrations of N-isopropylhydroxylamine (15% aq.) as heated from room temperature to about 149° C. (300° F.).

FIG. 5 shows the use of N-isopropylhydroxylamine (15% aq.) in the viscosity control of another polyacrylamide copolymer system. In FIG. 5, "control" means absence of N-isopropylhydroxylamine. As shown, adding N-isopropylhydroxylamine reduces the viscosity of the fluid very rapidly at 149° C. (300° F.). The application of the N-isopropylhydroxylamine is expected to give more controllable fluid breaks at lower temperatures as demonstrated in the derivatized polyacrylamide crosslinker fluid system described regarding FIG. 1 and FIG. 2, above.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method for treating a zone of a well, the method comprising the steps of:
   (A) introducing a well fluid into the zone of the well, wherein the well fluid comprises:
      (i) a water phase; and
      (ii) a water-soluble polymer in the water-phase; and
      (iii) a source of a water-soluble hydroxylamine or salt thereof selected from the group consisting of: N-isopropylhydroxylamine, N-hydroxysuccinimide, N-tert-butyl hydroxylamine, N,N-dimethylhydroxylamine, N,N-diethylhydroxylamine, N-hydroxyphthalimide, and any combination thereof; and (B) allowing the viscosity of the well fluid to break in the zone.

2. The method according to claim 1, wherein the hydroxylamine or salt thereof is in a concentration less than 1% by weight of the water.

3. The method according to claim 1, additionally comprising the step of controlling the breaking by adjusting the concentration of the hydroxylamine or salt thereof.

4. The method according to claim 1, wherein the zone has a design temperature of less than 93° C. (200° F.).

5. The method according to claim 1, wherein the zone has a design temperature of less than 66° C. (150° F.).

6. The method according to claim 1, wherein the water phase is the continuous phase of the well fluid.

7. The method according to claim 1, wherein the water-soluble polymer comprises a polyacrylamide or derivative thereof.

8. The method according to claim 1, wherein the water-soluble polymer comprises a polysaccharide or derivative thereof.

9. The method according to claim 1, wherein the water-soluble polymer comprises a galactomannan or derivative thereof.

10. The method according to claim 1, wherein the water-soluble polymer does not have functional groups selected from the group consisting of: an anhydride, a lactone, an ester, a thioanhydride, a thiolactone, and a thioester.

11. The method according to claim 1, wherein the well fluid additionally comprises a crosslinker for the water-soluble polymer.

12. The method according to claim 11, wherein the crosslinker comprises a transition metal.

13. The method according to claim 11, wherein the crosslinker comprises a polymeric crosslinker.

14. The method according to claim 13, wherein the polymeric crosslinker comprises a polyacrylamide derivative.

15. The method according to claim 14, wherein the polyacrylamide derivative comprises a polyacrylamide having one or more boronic acid functionalities.

16. The method according to claim 14, wherein the polyacrylamide derivative comprises copolymer of acrylamide and 3-acrylamido-phenyl boronic acid.

17. The method according to claim 13, wherein the well fluid does not include a transition metal crosslinker for the water-soluble polymer.

18. The method according to claim 1, wherein the well fluid does not include any breaker selected from the group consisting of: oxidizing breakers, enzymatic breakers, acid breakers, and any combination thereof.

19. The method according to claim 1, wherein the well fluid has a pH greater than 7.

20. The method according to claim 1, wherein the well fluid does not include a thermal stabilizer.

21. The method according to claim 1, wherein the well fluid does not include a transition metal crosslinker for the water soluble polymer, and wherein the well fluid breaks in less than 2 hours at a temperature less than or equal to 140° F.

* * * * *